Jan. 11, 1966 R. SCHWERTER 3,228,417
PRESSURE REGULATOR WITH HIGH PRESSURE CUT OFF
Filed Aug. 13, 1963
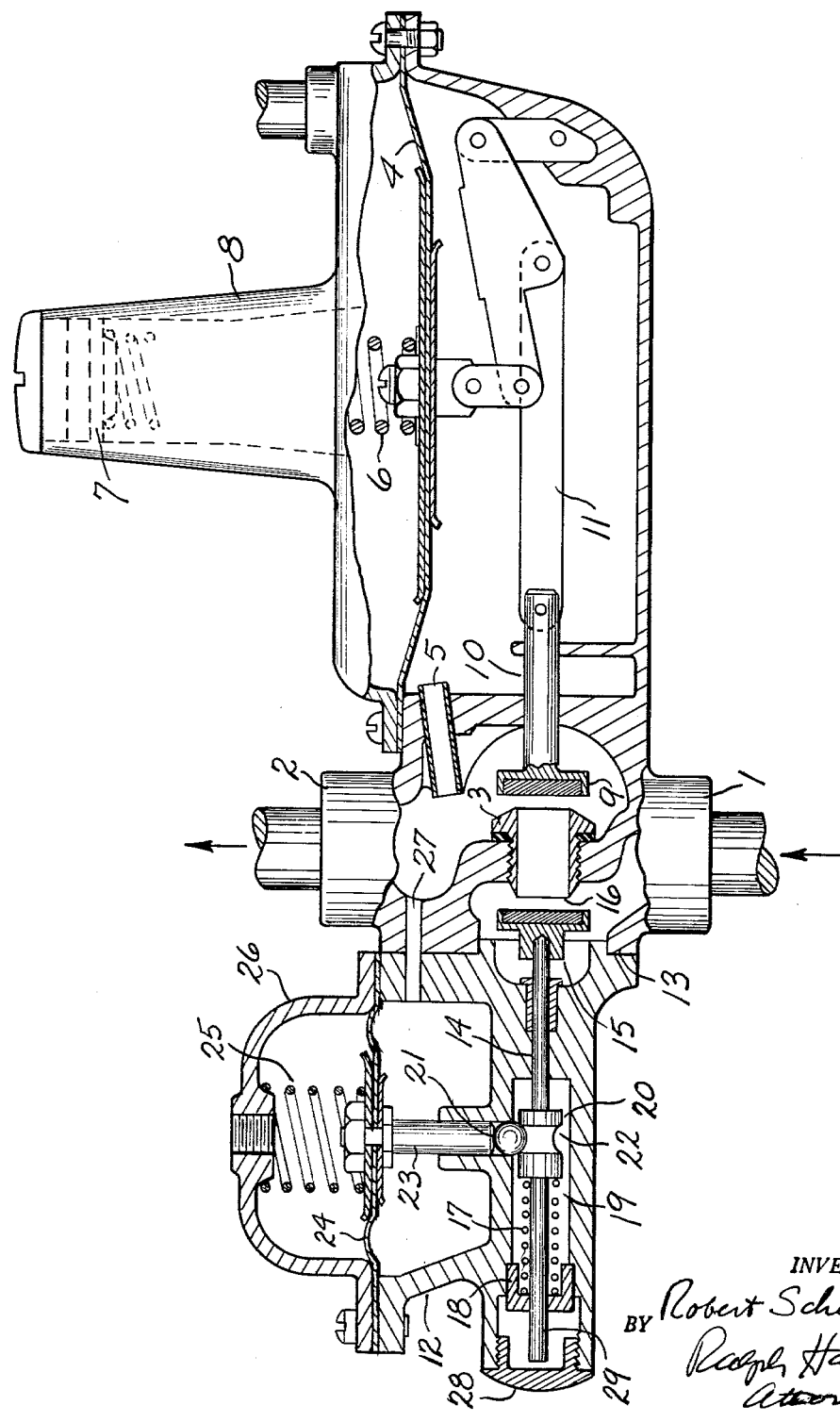
INVENTOR.
BY Robert Schwerter
Ralph Hammer
Attorney 3,228,417
PRESSURE REGULATOR WITH HIGH
PRESSURE CUT OFF
Robert Schwerter, Monterrey, Mexico, assignor to American Meter Company, Incorporated, Philadelphia, Pa., a corporation of Delaware
Filed Aug. 13, 1963, Ser. No. 301,846
3 Claims. (Cl. 137—461)

This invention is a pressure regulator with an over pressure shutoff which does not interfere with the controlled flow of the regulator and is relatively unaffected by friction.

In the accompanying drawing, the single figure is a longitudinal section through a gas pressure regulator.

The conventional parts of the gas pressure regulator are readily identified, 1 being the inlet, 2 the outlet, 3 the inlet orifice and 4 the diaphragm. The outlet pressure is applied to the under side of the diaphragm through a way 5. On the upper side of the diaphragm a spring 6 exerts a downward force determined by the adjustment of the spring seat member 7 screwed into an upwardly extending tubular portion 8. The diaphragm moves up or down until the outlet pressure on the under side of the diaphragm reaches equilibrium with the spring pressure on the upper side of the diaphragm. The flow of gas through the orifice 3 is controlled by a valve member 9 at one end of a plunger 10. The position of the valve member is controlled by a linkage 11 to permit the amount of gas required to maintain the outlet pressure. The parts so far described are or may be of common construction and may differ substantially in appearance from the construction illustrated.

Upon failure of the regulator to restrict the flow to that required to maintain the outlet pressure, the outlet pressure may rise to dangerously high values and the gas should be shut off until the required repairs have been made. This is accomplished by an over pressure shutoff having a housing 12 bolted to the valve chamber 13 directly opposite the inlet orifice 3. Slidably carried in the housing 12 is a valve stem 14 carrying a valve member 15 which cooperates with a seat 16 on the inlet end of the orifice 3. A spring 17 arranged between a seat 18 fixed in a bore 19 in the housing and a collar 20 fixed on the stem 14 biases the stem toward the closed position. The stem is held in the open position illustrated by a ball 21 which is urged downwardly into a groove 22 on the collar 20 by a plunger 23 attached to the center of a diaphragm 24. A spring 25 is arranged between a cover 26 and the upper side of the diaphragm 24. The outlet pressure communicates with the under side of the diaphragm 24 through a passageway 27.

As the outlet pressure rises, the upward force exerted by the diaphragm 24 on the spring 25 reduces the net downward force exerted by the plunger 23 on the ball 21 and permits the spring 17 to force the stem 14 to the closed position, insuring a sensitive shutoff point upon over pressure. The holding effect of the ball 21 is substantially unaffected by the coefficient of friction of the engaging surfaces. This contributes to the sensitive and consistent operation. Once the over pressure shutoff is tripped, the valve 15 is held closed against the seat 16. After the necessary repairs are made, resetting is effected by unscrewing the plug 28, grasping the end 29 of the plunger with pliers and pulling the stem 14 outward until the ball 21 seats in the groove 22.

From one aspect, the ball 21 in its reset position is held in a pocket between plunger 23 associated with the over pressure diaphragm 24 and the groove 22 associated with the over pressure valve 15. As the pressure rises, the diaphragm moves the plunger to enlarge the pocket radially until the ball clears the shoulder at the outer edge of the groove.

What is claimed as new is:

1. In a gas pressure regulator having an inlet and an outlet, a valve chamber having an inlet orifice between the inlet and outlet, said orifice having a first valve seat at one end presented to the outlet and a second valve seat at the other end presented to the inlet, a first valve member cooperating with said first valve seat, means responsive to the outlet pressure for regulating the first valve member to control the outlet pressure, a housing fixed to the valve chamber directly opposite the inlet orifice, a second valve member cooperating with said second valve seat, a stem carrying said second valve member slidably carried in the housing, a spring means biasing the stem to a position closing the second valve member against the second valve seat, a groove in said stem, a ball riding in said groove, a plunger slidably carried in the housing and extending transverse to the stem and having one end engaging the ball to hold it in the groove for holding the stem in the open position, a diaphragm in the housing connected to the other end of the plunger, said diaphragm being loaded by the outlet pressure in the direction to move the plunger away from the ball and by a spring in the direction to move the plunger toward the ball whereby the outlet pressure reduces the net force on the ball for holding the stem and over pressure releases the stem to close the second valve member against the second valve seat.

2. In a gas pressure regulator having an inlet and an outlet, a valve chamber having an inlet orifice between the inlet and outlet, said orifice having a first valve seat at one end presented to the outlet and a second valve seat at the other end presented to the inlet, regulating means including a first valve member cooperating with said first valve seat for controlling the outlet pressure, a housing fixed to the valve chamber directly opposite the inlet orifice, a second valve member cooperating with said second valve seat, a stem carrying said second valve slidably carried in the housing, spring means biasing the stem to a position closing the second valve member against the second valve seat, a groove in said stem, a ball riding in said groove, a plunger slidably carried in the housing and extending transverse to the stem and having one end engaging the ball to hold it in the groove for holding the stem in the open position, a diaphragm in the housing connected to the other end of the plunger, said diaphragm being loaded by the outlet pressure in the direction to move the plunger away from the ball and by a spring in the direction to move the plunger toward the ball whereby the outlet pressure reduces the net force on the ball for holding the stem and over pressure releases the stem to close the second valve member against the second valve seat.

3. In a gas pressure regulator having an inlet and an outlet, a valve chamber having an inlet orifice between the inlet and outlet, said orifice having a first valve seat at one end presented to the outlet and a second valve seat at the other end presented to the inlet, a first valve member cooperating with said first valve seat, means responsive to the outlet pressure for regulating the first valve member to control the outlet pressure, a housing fixed to the valve chamber directly opposite the inlet orifice, a second valve member cooperating with said second valve seat, a stem carrying said second valve member slidably carried in the housing, a spring means biasing the stem to a position closing the second valve member against the second valve seat, said stem having surfaces of different diameter with the surface of smaller diameter adjacent the second valve seat and a shoulder between the surfaces, a ball riding on the surface of smaller diameter, a plunger slidably carried in the housing and cooperating with the surface of smaller diameter to provide a pocket for the ball and to hold the ball against the surface of smaller diameter to hold the second valve in the open position, said plunger being movable in one direction to enlarge the pocket radially until the ball clears the shoulder, a diaphragm in the housing connected to the plunger, said diaphragm being loaded by the outlet pressure to move said plunger in said one direction and being loaded by a spring to move said plunger opposite to said one direction whereby the outlet pressure reduces the net force on the plunger and over pressure moves the plunger until the ball clears the shoulder and releases the stem to close the second valve member against the second valve seat.

References Cited by the Examiner

UNITED STATES PATENTS

| 2,658,521 | 11/1953 | Lyon | 137—461 |
| 2,718,899 | 9/1955 | Goddard | 137—463 |
| 2,940,468 | 6/1960 | Drabik | 137—461 |

FOREIGN PATENTS

| 1,129,739 | 9/1956 | France. |

ISADOR WEIL, *Primary Examiner.*